United States Patent [19]

Asano et al.

[11] Patent Number: 4,909,605
[45] Date of Patent: Mar. 20, 1990

[54] LIQUID CRYSTAL DISPLAY DEVICE

[75] Inventors: Kazuo Asano; Kazuo Arai; Shinichi Nishi, all of Hino, Japan

[73] Assignee: Konishiroku Photo Industry Co., Ltd., Tokyo, Japan

[21] Appl. No.: 94,136

[22] Filed: Sep. 4, 1987

[30] Foreign Application Priority Data

Sep. 12, 1986 [JP] Japan ............... 61-213774

[51] Int. Cl.$^4$ .............................. G02F 1/13
[52] U.S. Cl. ..................... 350/346; 350/341; 350/350 R
[58] Field of Search ............ 350/346, 350 R, 332, 350/333, 341

[56] References Cited

U.S. PATENT DOCUMENTS

| | | | |
|---|---|---|---|
| 4,372,871 | 2/1983 | Toriyama et al. | 350/333 X |
| 4,374,748 | 2/1983 | Inukai et al. | 350/350 R X |
| 4,577,930 | 3/1986 | Yang | 350/332 |
| 4,583,826 | 4/1986 | Petrzilka et al. | 350/350 R |
| 4,596,446 | 6/1986 | Waters et al. | 350/346 |
| 4,629,290 | 12/1986 | Shionozaki et al. | 350/350 R |
| 4,634,229 | 1/1987 | Amstutz et al. | 350/346 |
| 4,653,865 | 3/1987 | Kando et al. | 350/346 |
| 4,664,483 | 5/1987 | Sprang et al. | 350/346 |
| 4,693,562 | 9/1987 | Hasegawa et al. | 350/346 |
| 4,779,960 | 10/1988 | Kozaki et al. | 350/346 |
| 4,799,774 | 1/1989 | Baur et al. | 350/341 |
| 4,815,825 | 3/1989 | Nakagomi et al. | 350/346 X |

FOREIGN PATENT DOCUMENTS

| | | | |
|---|---|---|---|
| 0155033 | 9/1985 | European Pat. Off. | 350/346 |
| 0217354 | 4/1987 | European Pat. Off. | 350/350 R |
| 0234892 | 9/1987 | European Pat. Off. | 350/341 |
| 0259822 | 3/1988 | European Pat. Off. | 350/350 R |
| 3423993A1 | 1/1985 | Fed. Rep. of Germany | 350/346 |
| 3500897A1 | 7/1986 | Fed. Rep. of Germany | 350/350 R |
| 3609141 | 9/1987 | Fed. Rep. of Germany | 350/341 |

OTHER PUBLICATIONS

Hacker et al "Liquid Crystal Reflection Cell with Improved Response Time", Applied Optics vol. 19, No. 19, Oct. 1, 1980 pp. 3257-3259.
European Search Report No. EP 87113073.8, issued 12/17/87.

*Primary Examiner*—Stanley D. Miller
*Assistant Examiner*—Napoleon Thantu
*Attorney, Agent, or Firm*—Finnegan, Henderson, Farabow, Garrett and Dunner

[57] ABSTRACT

There is disclosed a liquid crystal display device which comprises liquid crystal materials aligned between a pair of substrates each having an alignment layer, respectively, characterized in that the following conditions (a) to (c) are satisfied:

(a) the twist angle of the liquid crystal molecules aligned between the above pair of substrates is 200° to 300°;

(b) the following relationship formula (1) is valid between the spontaneous twist pitch Ps of the liquid crystal molecules and the regulated twist pitch Pc of the liquid crystal molecules when the arrangement of liquid crystal molecules is compulsorily regulated by the alignment layers:

$$0 \leq (Pc - Ps)/Pc \leq 0.3 \qquad (1); \text{ and}$$

(c) the following relationship formula (2) is valid between the splay elastic constant $k_{11}$ and the bend elastic constant $k_{33}$ of the above liquid crystal materials:

$$0.9 < k_{33}/k_{11} < 1.5 \qquad (2).$$

15 Claims, 3 Drawing Sheets

LIQUID CRYSTAL DISPLAY DEVICE

BACKGROUND OF THE INVENTION

This invention relates to a liquid crystal display device, particularly to a liquid crystal display device of the twisted nematic type (hereinafter sometimes referred to also as "TN type") which is suitable for a multiplex driving system (a time sharing driving system).

Liquid crystal display devices find applications primarily of the TN type in uses which are now expanding for having such advantages that power consumption is small, that production cost is low, that it can be made lightweight and thin, that it is easily applicable for color display, etc.

A liquid crystal display device of the TN type is constituted by sealing a nematic liquid crystal having a positive dielectric constant anisotropy between two sheets of electrode substrates subjected to aligning treatment, and is generally made under the state in which the liquid crystal molecules are sequentially twisted by 90°.

The liquid crystal display device of this type with a twist angle of 90° (hereinafter sometimes called as "90° twisted type") can be produced simply and is suitable for mass production, and also has the advantage of rapid response.

However, the liquid crystal display device of the 90° twisted type is moderate in intensity change of transmitted light (or reflected light) to the change in applied voltage, and therefore has the problems such that the contrast is low to give sharp images with difficulty and also the viewing angle is narrow when the time sharing order is made greater in multiplex driving, thus being limited in application for high multiplex driving system. For example, in a liquid crystal display device with the display area of about A4 size, the duty ratio in multiplex driving has been practically preferred to be 1/200 or higher, but said duty ratio practically applied in the liquid crystal display device is about 1/100, with its contrast ratio (ratio of luminance on selected elements to that on unselected elements) being as low as about 3.

As a technique for solving the problems of such a 90° twist type liquid crystal display device, Japanese Provisional Patent Publication No. 107020/1985 discloses a liquid crystal display device characterized in that the twist angle of liquid crystal molecules is 180° to 360° and the angle between the director direction of the liquid crystal molecules alignment on at least one of the electrode substrates and the surface of the electrode substrate (hereinafter sometimes referred to also as "pretilt angle") is greater than 5°. According to this liquid crystal display device, since the intensity change of transmitted light to the change in applied voltage is steep, it is stated that a high contrast ratio of 19.6 can be realized in the case of multiplex driving at a duty ratio of 1/100.

However, in this liquid crystal display device, no sufficient consideration has been given to the bistable effect and, for this reason, there is the problem that response is slow when the liquid crystal display device is subjected to multiplex driving at a high duty ratio. More specifically, in the liquid crystal cell of this liquid crystal display device, there ordinarily occurs the so-called hysteresis phenomenon in which the intensity change of transmitted light or the reflected light during increasing the applied voltage is different from that during decreasing of the applied voltage. Due to the bistable effect which causes this phenomenon, there are involved the problems such that the practical voltage range during time sharing driving may be narrowed or the response time for on-off may be elongated. Also, as the result of these problems, the display badness is liable to occur by non-uniformity of the liquid crystal layer thickness, the temperature change, etc. For this reason, it becomes necessary to suppress the bistable effect as small as possible.

For such reasons, the present inventors have proposed a liquid crystal display device characterized in that the twist angle of the liquid crystal molecules aligned between a pair of substrates having alignment layers respectively is 180° or more and 360° or less, and the relationship formula of $0 < (Pc-Ps)/Pc < 0.3$ is valid between the spontaneous twist pitch Ps of the liquid crystal molecules and the regulated twist pitch Pc of the liquid crystal molecules when the arrangement of the liquid crystal molecules is compulsorily regulated by the alignment layer (see Japanese Patent Publication No. 127714/1987 which corresponds to U.S. Ser. No. 06/935,225 now in pending).

According to such a liquid crystal display device, the bistable effect of a liquid crystal cell can be suppressed to some extent to give a result that the margin in the change of driving voltage can be made greater to effect considerably improvement in contrast ratio and response speed.

However, in these days, it has been desired to have a liquid crystal display device of further quick response to necessitate further improvement of the above technique.

SUMMARY OF THE INVENTION

The present invention has been accomplished in view of the state of the art as described above, and its object is to provide a liquid crystal display device having sufficiently high contrast ratio and also excellent response characteristic with the time required for on-off being extremely short even in the case of multiplex driving at a high duty ratio.

The liquid crystal display device of the present invention is a liquid crystal display device comprising liquid crystal materials aligned between a pair of substrates each having an alignment layer, characterized in that the following conditions (a) to (c) are satisfied:

(a) The size of the twist angle of the liquid crystal molecules aligned between the above pair of substrates is 200° to 300°;

(b) The following relationship formula (1) is valid between the spontaneous twist pitch Ps of the liquid crystal molecules and the regulated twist pitch Pc of the liquid crystal molecules when the arrangement of liquid crystal molecules is compulsorily regulated by the alignment layers:

$$0 \leq (Pc-Ps)/Pc \leq 0.3 \qquad (1); \text{ and}$$

(c) The following relationship formula (2) is valid between the splay elastic constant $k_{11}$ and the bend elastic constant $k_{33}$ of the above liquid crystal materials:

$$0.9 < k_{33}/k_{11} < 1.5 \qquad (2).$$

Further, it is characterized in that (d) the angle created between the director direction of the liquid crystal molecule contacting at least one of the alignment layer surfaces and the substrate surface having said alignment layer (pretilt angle) is not less than 5°; and further that (e) the ratio $\Delta\epsilon/\epsilon\perp$ of the dielectric constant anisotropy $\Delta\epsilon$ of the liquid crystal materials to the dielectric constant $\epsilon\perp$ in the direction perpendicular to the longer axis direction of liquid crystal molecules is 1.8 or higher.

The liquid crystal display device of the present invention satisfies the above conditions (a) to (c), and therefore, as will be understood from the description of examples as described below, the bistable effect in the liquid crystal cell can be suppressed to its minimum to give the result that sufficiently high constant ratio and also sufficient quick response characteristics can be obtained is excellent even in the case of multiplex driving at a high duty ratio.

According to the present invention, it is practically possible to obtain a liquid crystal display device having the characteristics of a contrast ratio of 13 or higher, and yet a response time of 150 msec or shorter, which is by far superior in performance as compared with a device of the prior art.

Further, by employment of the preferable condition (e), high multiplex driving can be performed sufficiently at a low driving voltage in a liquid crystal display device, whereby it becomes possible to obtain a liquid crystal display device of low cost and small power consumption.

DESCRIPTION OF THE PREFERRED EMBODIMENTS

In the following, the present invention is described specifically.

Figure 1:
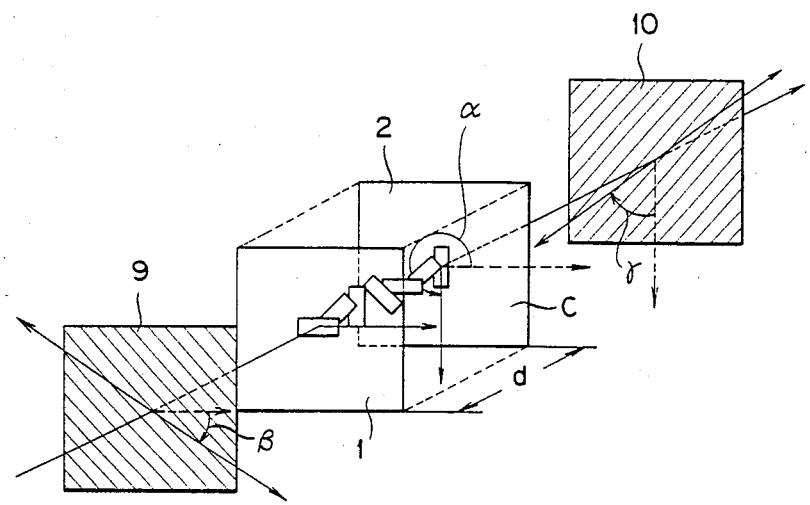
FIG. 1 is a schematic illustration of the present invention.
Figure 2:
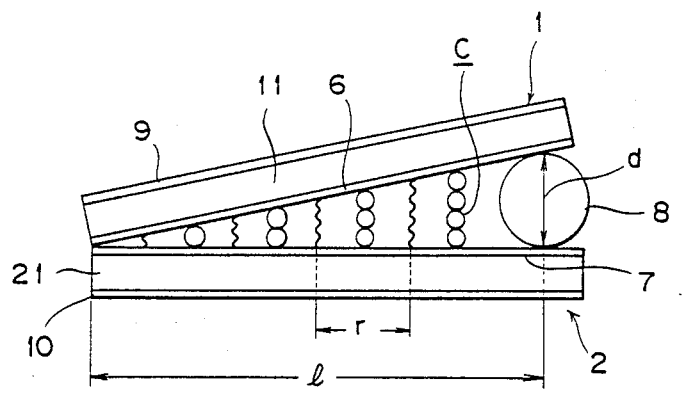
FIG. 2 is an illustration for specifying the spontaneous twist pitch Ps.

FIG. 1 is a schematic illustration of a liquid crystal display device according to the present invention, of which the pertinent portions are exploded. In FIG. 1, 1 and 2 are upper and lower substrates having alignment layers (not shown), respectively, 9 and 10 are polarizers and C is a liquid crystal layer.

In the present invention, (a) the twist angle $\alpha$ of the liquid crystal layer is required to be 200° to 300°, particularly preferably 240° to 290°.

If the twist angle $\alpha$ is less than 200°, the intensity change of the transmitted light or the reflected light from the display device when changing the applied voltage becomes moderate and sufficiently high contrast ratio cannot be obtained and also the viewing angle becomes narrower in highly multiplexed driving. On the other hand, if the twist angle $\alpha$ exceeds 300°, the turn-on and turn-off time of the display elements becomes longer and also the alignment of the liquid crystal molecules is liable to be disturbed when applying the driving voltage to lower the display quality.

The twist angle $\alpha$ can be defined by the directions of the aligning treatment for defining the alignment direction of the liquid crystal molecules on the upper substrate 1 and the lower substrate 2, the kinds and amounts of the nematic liquid crystal constituting the liquid crystal layer C or the optically active substance added thereto, etc.

In FIG. 1, the twist angle $\alpha$ indicates a twist in the counterclockwise direction with respect to the propagating direction of the incident light, but this is not limitative of the present invention, but said twisting direction may be also clockwise.

In the present invention, (b) the following relationship formula (1) is required to be valid between the spontaneous twist pitch Ps of the liquid crystal materials and the regulated twist pitch Pc of the liquid crystal materials when the arrangement of the liquid crystal molecules is compulsorily regulated by the alignment layers:

$$0 \leq (Pc - Ps)/Pc \leq 0.3 \qquad (1).$$

Particularly, it is preferred that the following relationshp formula should be valid:

$$0.5 \leq (Pc - Ps)/Pc \leq 1.5.$$

When the value of this (Pc−Ps)/Pc is 0 or less, the bistable effect becomes greater in the liquid crystal cell to give a result that, although the contrast ratio may become higher, the turn-on and turn-off times become longer to lower the response characteristic. On the other hand, when the value of (Pc−Ps)/Ps exceeds 0.3, the intensity change of the transmitted light or the reflected light to the change in the applied voltage becomes mode-rate, whereby no sufficiently high contrast ratio can be obtained and also disturbance of the alignment of the liquid crystal molecules will readily occur when the driving voltage is applied, to lower display quality.

Here, spontaneous twist pitch Ps refers to a pitch in natural twisting of liquid crystal materials which will occur in the liquid crystal by addition of an optically active substance, etc., into a conventional nematic liquid crystal. More specifically, as shown in FIG. 2, by constituting a liquid crystal cell with arrangement of the upper substrate 1 and the lower substrate 2 having the alignment layers 6 and 7 respectively thereon in shape of a wedge on the opposed surfaces of the supporting plates 11 and 21, followed by filling the cell with liquid crystal materials, and measuring the interval r of the stripe pattern (disclination line per ½ pitch) thereby formed on the liquid crystal cell surface, the liquid crystal cell thickness d (thickness of the liquid crystal layer C) and the liquid crystal cell length 1, it can be determined according to the following formula:

Spontaneous twist pitch: $Ps = 2\ dr/1$.

In FIG. 2, 8 is a spacer, 9 and 10 are polarizing devices, and the alignment layers 6 and 7 are applied with aligning treatments which are in parallel to each other.

also, the regulated twist pitch Pc is defined according to the following formula by the thickness d of the liquid crystal layer C and the twist angle $\alpha$ of the liquid crystal molecules defined by the aligning treatment directions of the alignment layers of the upper substrate 1 and the lower substrate 2 in FIG. 1:

Regulated twist pitch: $Pc = (360°/\alpha) \times d$.

In the present invention, (c) the following relationship formula (2) is required to be valid between the splay elastic constant $k_{11}$ and the bend elastic constant $k_{33}$ of the liquid crystal materials:

$$0.9 < k_{33}/k_{11} < 1.5 \tag{2}$$

Particularly, it is preferred that the following relationship formula should be valid:

$$1.0 < k_{33}/k_{11} < 1.3.$$

When the value of this $k_{33}/k_{11}$ is less than 0.9, substantially no bistable effect can be obtained, and consequently the intensity change of the transmitted light or the reflected light to the change in the applied voltage becomes moderate to give no sufficiently high contrast ratio. On the other hand, when the value of this $k_{33}/k_{11}$ exceeds 1.5, the bistable effect becomes excessive, and consequently the time required for on-off becomes longer to lower the response characteristic, and also disturbance of the liquid crystal alignment in shape of stripes will readily occur.

Here, the value of $k_{33}/k_{11}$ may be measured according to methods such as the method of obtaining from change in the electric capacity or from the threshold value of optical change of the liquid crystal cell at the time when a magnetic field is applied to said liquid crystal cell uniformly aligned (H. Gruler, et al., Z. Naturforsch, 279 (1972) p. 966), a method of obtaining from change in the electric capacity of the liquid crystal cell at the time when an electrical field is applied to said liquid crystal cell uniformly aligned (H. Deuling, Mol. Cryst. Liq. Cryst..19 (1972) p. 123), etc.

In a specific application, the suitable value of $k_{33}/k_{11}$ can be attained by suitably mixing various liquid crystal materials to give a liquid crystal composition.

The liquid crystal display device of the present invention satisfies the conditions (a) to (c) as described above, and therefore even in the case of multiplex driving with high duty ratio, the intensity change of the transmitted light or the reflected light to the applied voltage can be made steeper to give sufficiently high contrast ratio, and also it has excellent response characteristics.

In the present invention, (d) the angle between the director direction of the liquid crystal molecules contacting at least one of the alignment layer surfaces of the pair of alignment layers and the substrate surface having said alignment layers (pretilt angle) is preferred to be 5° or more, preferably 15° or more. Here, the director direction refers to the direction in which the molecular longer axis of the liquid crystal molecule is preferentially aligned.

If the pretilt angle is less than 5° on either side of the pair of alignment layers, the intensity change of the transmitted light or the reflected light to the change in the applied voltage cannot become steep, and the alignment of the liquid crystal molecules is liable to be disturbed when the driving voltage is applied, with the result that the display quality is lowered.

Further, in the present invention, (e) it is preferred that the ratio $\Delta\epsilon/\epsilon_\perp$ of the dielectric constant anisotropy $\Delta\epsilon$ to the dielectric constant $\epsilon_\perp$ in the direction perpendicular to the longer axis direction of the liquid crystal molecule should be 1.8 or higher. By selecting such a preferable range, sufficiently high multiplex driving can be performed with a low driving voltage in a liquid crystal display device, whereby it becomes possible to obtain a liquid crystal display device of low cost and small power consumption.

When the value $\Delta\epsilon/\epsilon_\perp$ is excessively small, the driving voltage becomes higher and also the intensity change of the transmitted light or the reflected light to the applied voltage becomes moderate, whereby it may become sometimes difficult to obtain sufficiently high contrast ratio.

Next, other preferable conditions in preparing practically the liquid crystal display device according to the present invention are to be described.

(i) It is preferred that the liquid crysal materials should comprise many nematic liquid crystal mixtures and the transition temperature $T_{NI}$ from the nematic liquid crystal phase to an isotropic liquid phase in said liquid crystal materials should be 90° C. or higher.

Thus, by selecting such preferable conditions, it becomes possible to suppress fluctuations in display color, driving voltage, response speed, etc., caused by temperature changed within the range of temperature conventionally used for the liquid crystal display device to reduced levels, whereby a liquid crystal display device with high reliability can be obtained.

(ii) It is preferable that the liquid crystal materials should have a refractive index anisotropy $\Delta n$ which is 0.12 or more.

Thus, by selecting such a preferable condition, the liquid crystal cell can be made thinner, whereby the time required for on-off can be extremely shortened to give a device having further excellent response characteristic.

(iii) The viscosity at a temperature of 20° C. of the liquid crystal materials should preferably be 30 cp or lower.

Thus, by selecting such a preferable condition, the turnon time in the liquid crystal display device can be made extremely short to give a device with further excellent response characteristic.

(iv) It is preferred that the following relationship formula (3) should be valid between the twisting elastic constant $k_{22}$ and the bend elastic constant $k_{33}$ of the liquid crystal materials:

$$1.8 < k_{33}/k_{22} < 2.5 \tag{3}$$

When the value of this $k_{33}/k_{22}$ is small, sufficient bistable effect cannot be obtained in some cases, and consequently the intensity change of the transmitted light or the reflected light to the applied voltage becomes mode-rate to sometimes lower the contrast ratio. On the other hand, the value of this $k_{33}/k_{22}$ is large, the bistable effect becomes excessive in some cases, and consequently the time required for on-off becomes longer to sometimes lower the response characteristic, and also disturbance of the liquid crystal alignment in shape of stripes will readily occur in some cases.

Further, in the present invention, the product $\Delta n \cdot d$ of a refractive index anisotropy $\Delta n$ of the liquid crystal materials and a thickness d ($\mu$m) of the liquid crystal layer C should preferably be 0.4 to 1.5, particularly 0.8 to 1.2. By selecting such a preferable condition, further higher contrast ratio can be obtained, and also the display picture surface can be made lighter.

In FIG. 1, $\beta$ is an angle between the polarizing axis direction of the polarizing device 9 and the director direction of the liquid crystal molecules contacting the surface of the substrate 1, namely the direction in which the molecular longer axis of the liquid crystal molecule is preferentially aligned (provided that it is the director direction projected onto the substrate surface when the liquid crystal molecule has a pretilt angle which is not zero with the substrate surface) (hereinafter sometimes referred to as "deviated angle"), and $\gamma$ is a deviated angle between the polarizing axis direction of the polarizing device 10 and the director direction of the liquid crystal molecule contacting the surface of the substrate 2. The deviated angles $\beta$ and $\gamma$ take, as a positive value, the clockwise direction from the director direction of the liquid crystal molecule contacting to the surface of the substrate toward the polarizing axis direction of the polarizing device when the twisting direction of the liquid crystal molecule in the liquid crystal layer C twists in the counterclockwise direction to the propagating direction of the incident light. On the other hand, when the twisting direction of the liquid crystal molecule in the liquid crystal layer is the clockwise direction to the propagating direction of the incident light, in contrast to the above, they take the counterclockwise direction as a positive value.

These deviated angles $\beta$ and $\gamma$ should be preferably set at values so that the value of the sum of these angles $\beta+\gamma$ may be within the ranges of $90°\pm20°$, $-90°\pm20°$ or $0°\pm20°$. Further, it is also preferred that the value of the deviated angle $\beta$ should be set at a value within the range of $\pm15°$ with $(360°-\alpha)/2$ or $-(\alpha-180°)/2$ as the center. By setting thus the deviated angles $\beta$ and $\gamma$ at preferable values, the light state can be made lighter, and also the dark state darker, with the result that the contrast can be further improved.

Figure 3:
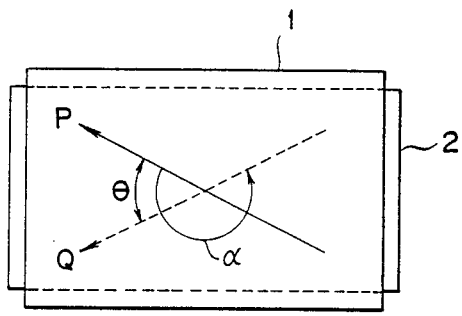
FIG. 3 and FIG. 4 are illustrations of the respective aligning treatment directions.
Figure 4:
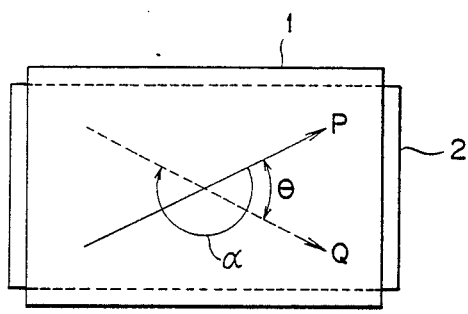

In the present invention, for realizing a liquid crystal display device in which the twisting direction of the liquid crystal molecule is the counterclockwise direction to the propagating direction of the incident light and also the size of the twist angle $\beta$ of said liquid crystal molecules is 200° to 300°, the aligning treatment direction of the respective alignment layers on the upper substrate 1 and the lower substrate 2 should be set, as shown in FIG. 3, so that the angle $\theta$ created between the aligning treatment direction P of the upper substrate 1 and the aligning treatment direction Q of the lower substrate 2 may be 20° to 120°, and to the liquid crystal materials aligned between the upper substrate 1 and the lower substrate 2, a suitable amount of the optically active substance may be added so that the liquid crystal materials may have the spontaneous twist pitch Ps twisting in the counterclockwise direction which corresponds to the regulated twist pitch Pc. On the other hand, for realizing a liquid crystal display device in which the twisting direction of the liquid crystal molecule is the clockwise direction to the propagating direction of the incident light and also the size of the twist angle $\alpha$ of said liquid crystal molecule is 200° to 300°, the aligning treatment directions of the respective alignment layers on the upper substrate 1 and the lower substrate 2 should be set, as shown in FIG. 4, so that the angle $\theta$ created between the aligning treatment direction P of the upper substrate 1 and the aligning treatment direction Q of the lower substrate 2 may be 20° to 120°, and to the liquid crystal materials aligned between the upper substrate 1 and the lower substrate 2, a suitable amount of the optically active substance may be added so that the liquid crystal materials may have the spontaneous twist pitch Ps twisting in the clockwise direction which corresponds to the regulated twist pitch Pc.

Here, the aligning treatment direction refers to, for example, the vapor deposition direction when the alignment layer is formed by the oblique evaporation method and refers to, for example, the rubbing direction when the alignment layer is formed by the rubbing method. The same can be applied to the cases of the other aligning treatments.

Further, in the present invention, in order to stabilize the twisted state of the liquid crystal molecules and to prevent formation of aligned portions of liquid crystal molecules having different twist angles, it is preferred that the following relationship formula should be valid between the thickness d of the liquid crystal layer C and the spontaneous twist pitch Ps:

$$[(\alpha/360)-0.25]<d/Ps<[(\alpha/360)+0.30]$$

When the value of d/Ps is excessively small, there may sometimes be formed an aligned portion having a twist angle which is 180° smaller than the twist angle $\alpha$ to be set. On the other hand, when the value d/Ps is excessively large, there may sometimes be formed an aligned portion having a twist angle which is 180° larger than the twist angle $\alpha$ to be set.

The means for obtaining a substrate having an alignment layer which can be used in the present invention is not particularly limited, but various means known in the art can be employed. More specifically, it is possible to use a means in which a substance such as SiO, MgO, $MgF_2$, etc., is evaporated on the substrate surface from an oblique direction to thereby effect the aligning treatment of said substrate surface, a means in which a coating of a polymeric substance such as an imide type, amide type, polyvinyl alcohol type, phenoxy type polymer, etc., is provided on the substrate surface, followed by aligning treatment according to the rubbing method which forms grooves on the surface in a certain direction by rubbing the surface of the coating with a woven cloth, flocked cloth, flocculated cloth, etc. such as a cotton cloth, Vinylon (trade name) cloth, Tetoron (trade name) cloth, Nylon (trade name) cloth, Rayon (trade name) cloth or carbon fibers, etc., or a means in which the surface of the substrate is coated with a carboxylic acid-chromium complex, an organic silane compound, etc., by coating or plasma polymerization, etc., and the liquid crystal molecules are alignment on the substrate by chemical adsorption, a means in which grooves in shape of grating are formed on the surface of the substrate in a certain direction according to a means such as photolithography or anisotropic etching, to orient the liquid crystal molecules or other means.

The liquid crystal materials constituting the liquid crystal layer C which can be used in the present invention may include, for example, the nematic liquid crystals shown below or mixtures of these, etc. However, the present invention is not limited to these.

(1) Cyclohexylcarboxylic acid ester type compounds represented by the following structural formula:

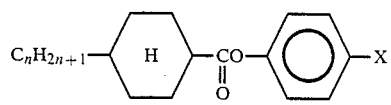

(wherein X represents R (an alkyl group having 1 to 18 carbon atoms, hereinafter the same), OR, CN or

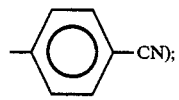

and n is an integer of 1 to 18), (2) Biphenyl type compounds represented by the following formula:

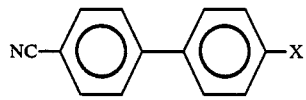

(wherein X represents R, OR or

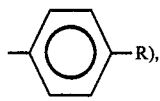

(3) Phenylcyclohexane type compounds represented by the following structural formula:

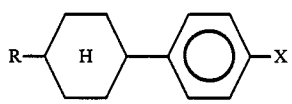

(wherein X represents R, OR, CN or

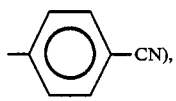

(4) Pyrimidine type compounds represented by the following structural formula:

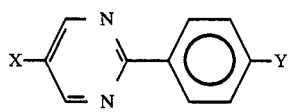

(wherein X represents R, CN or

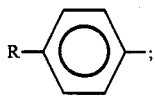

and Y represents R, OR or CN), (5) Azo type-azoxy type compounds represented by the following structural formula:

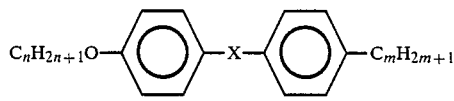

(wherein X represents —N=N—,

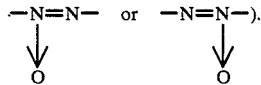

(6) Benzoic acid ester type compounds represented by the following structural formula:

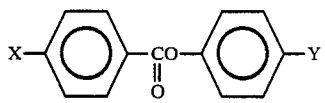

(wherein X represents R, OR or

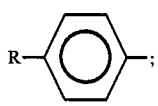

and Y represents R, OR, CN or

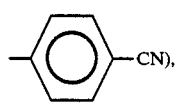

(7) Trane type compounds represented by the following structural formula:

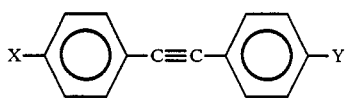

(wherein X and Y each represent F, R, OR,

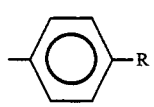

or

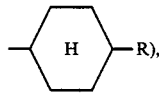

(8) Ethane type compounds represented by the following structural formula:

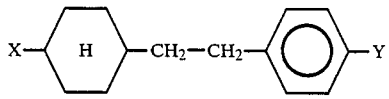

(wherein X and Y each represent R, OR,

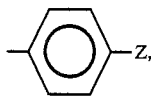

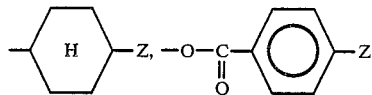

or

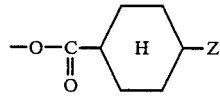

and Z represents H, F, Cl, Br or R.)

In the liquid crystal materials to be used in the present invention, a smectic liquid crystal component, a cholesteric liquid crystal component, etc., may also be contained, if necessary.

As the optically active substance to be contained in the liquid crystal materials to be used in the present invention, it is possible to use a nematic liquid crystal of the ester type, biphenyl type, phenylcyclohexane type or azo type having the optically active groups as terminal group represented by the formulae shown below, which is generally called as chiral nematic liquid crystal.

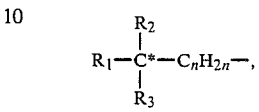

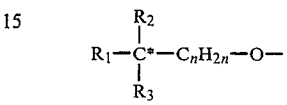

(wherein $R_1$, $R_2$ and $R_3$ are each alkyl group or hydrogen atom, and $R_1$, $R_2$ and $R_3$ are different from each other; C* represents asymmetric carbon atom; and n is the same as defined above).

Specifically, for example, the compounds represented by the following structural formulae can be used.

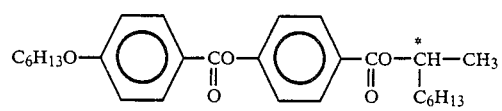

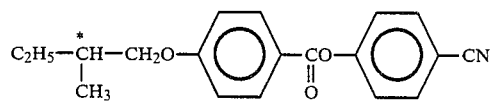

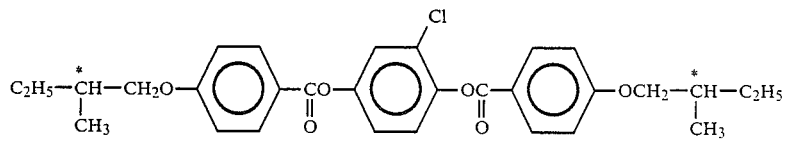

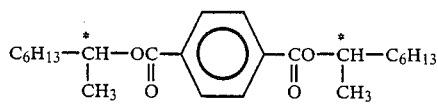

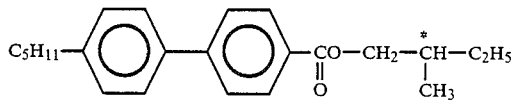

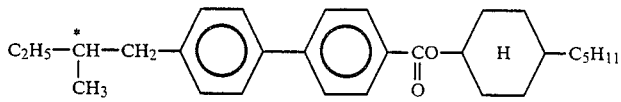

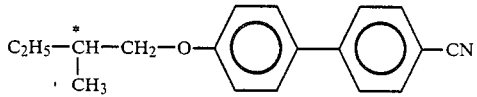

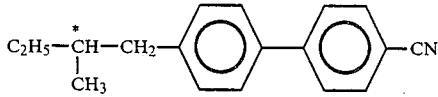

As the optically active substance to be contained in the liquid crystal materials to be used in the present invention, it is preferable to use one which can make the spontaneous twist pitch per unit amount added to the nematic liquid crystal sufficiently short, and by selecting such a substance, the necessary amount of the optically active substance added to the nematic liquid crystal can be suppressed small, preferably 1.5% by weight or less, whereby lowering in the transition temperature $T_{NI}$ from the nematic liquid crystal to the isotropic liquid caused by addition of the optically active substance can be suppressed minimum and also the temperature dependency of the spontaneous twist pitch can be made smaller. Also, in the present invention, for the purpose of making smaller the temperature dependency of the spontaneous twist pitch, plural kinds of optically active substances having temperature change coefficients of spontaneous twist pitch of signs opposite to each other may be used in combination.

Figure 5:
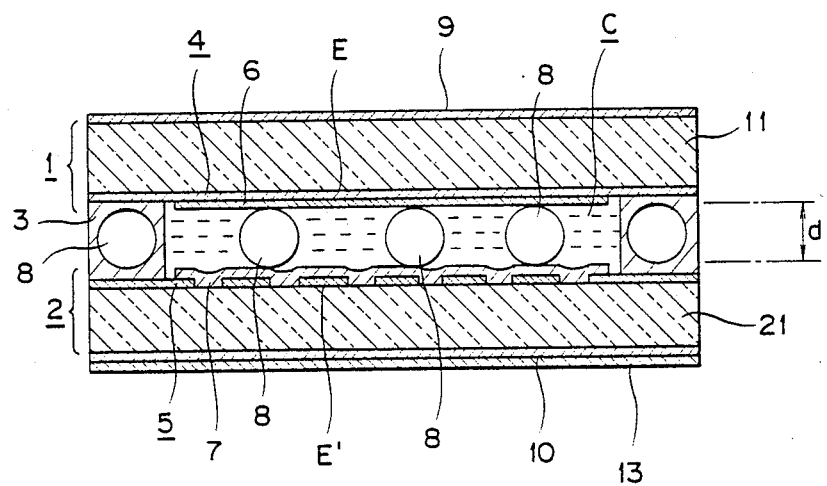
FIG. 5 is a sectional view for illustration of an example of the present invention.

In the following, the present invention is described by referring to a specific example. FIG. 5 is a sectional view for illustration, showing an example of the liquid crystal display device according to the present invention. In the liquid crystal display device of this example, two sheets of the upper substrate 1 and the lower substrate 2 are opposed to each other under the state apart from each other, the upper substrate 1 being constituted by providing an electrode layer 4 and an alignment layer 6 on the surface on the inner side of the supporting plate 11, while the lower substrate 2 being constituted by providing an electrode layer 5 and an alignment layer 7 on the surface on the inner side of the supporting plate 21. Further, the space between the upper substrate 1 and the lower substrate 2 is sealed with a sealing portion 3 to constitute a liquid crystal cell. Internally of the liquid crystal cell, several spacers 8 are placed under the state apart from each other, with filling of a liquid crystal materials to form a liquid crystal layer C. Also, on the surface on the outside of the upper substrate 1 and the lower substrate 2, the front polarizing device 9 and the rear polarizing device 10 are provided, respectively. In this Figure, 13 is a reflection plate provided on the surface on the outside of the rear polarizing device 10. In the transmission type liquid crystal display device, no reflection plate 13 may be used.

As the material constituting the above supporting plates 11 and 21, there may be employed glasses such as soda glass, borosilicate glass, quartz glass, etc.; plastic sheets comprising monoaxially stretched polyethylene terephthalate, polyethylenesulfone, polyvinyl alcohol, etc.; metal sheets comprising aluminum, stainless steel, etc.; and so on.

The above electrode layers 4 and 5 may be constituted of transparent electrodes E and E' comprising, for example, ITO (oxides of tin and indium) with a thickness of 1000 Å aligned in parallel to and apart from each other on the surfaces of the supporting plates 11 and 21 with, for example, a thickness of 1.1 mm, the transparent electrode E constituting one electrode layer 4 and the transparent electrode E' constituting the other electrode layer 5 being aligned so as to be mutually perpendicular to each other, whereby an electrode structure for displaying a matrix shape comprising, for example, picture elements of 0.3 mm×0.3 mm is given.

The above alignment layers 6 and 7 may be constituted of, for example, evaporated films with a thickness of 500 Å formed of, for example, SiO as the evaporating material by the oblique eveporation method (evaporation angle: 7° with respect to each of the supporting plates 11 and 21).

The upper substrate 1 and the lower substrate 2 may be also provided with a dielectric material layer, an alkali ion migration preventive layer, a reflection preventive layer, a polarizing layer, a reflective layer, etc, if necessary.

The above front polarizing device 9 may be constituted of "F-1205DU" (trade name, produced by Nitto Denko K.K.) and is aligned so that the polarizing axis direction may have a deviated angle $\beta$ of 40° relative to the director direction of the liquid crystal molecules contacting the surface of the alignment layer 6. Similarly, the rear polarizing device 10 and the reflection plate 13 may be constituted of "F-3205M" (trade name, produced by Nitto Denko K.K.), with the rear polarizing device 10 being aligned so that the polarizing axis direction of the rear polarizing device 10 may have a deviated angle $\gamma$ of 50° relative to the director direction of the liquid crystal molecules contacting the surface of the alignment layer 7.

The above spacer 8 may be constituted by use of a glass fiber "PF-65S" (trade name, produced by Nippon Denki Glass K.K.), and the above sealing portion 3 constituted by use of a "Struct-bond XN-5A-C" (trade name, produced by Mitsui Toatsu Kagaku K.K.).

EXAMPLES

In the following, the present invention will be described in more detail, but the present invention is not limited by these.

EXAMPLE 1

As the liquid crystal materials constituting the liquid crystal layer C, a material comprising 1.32% by weight of an optically active substance (chiral nematic liquid crystal) "S-811" (trade name, produced by E. Merck Co.) added to a nematic liquid crystal A ($k_{33}/k_{11}$: 1.1, $\Delta\epsilon/\epsilon\perp$: 2.4, $\Delta$n: 0.15, $T_{NI}$: 97.4° C., $\eta$ (20° C.): 20 cp) (produced by Chisso Co.) (this is called "liquid crystal material 1") was used to prepare a liquid crystal display device having the same constitution as shown in FIG. 5.

The above liquid crystal material 1 has the following characteristics.

Ratio $k_{33}k_{11}$ of the bend elastic constant $k_{33}$ to the splay elastic constant $k_{11}=1.1$, Ratio $\Delta\epsilon/\epsilon\perp$ of the dielectric constant anisotropy $\Delta\epsilon$ to the dielectric constant $\epsilon\perp$ in the direction perpendicular to the longer axis direction of the liquid crystal molecule=2.4, Transition temperature from nematic liquid crystal to isotropic liquid $T_{NI}=97.4$° C., Refractive index anisotropy $\Delta n=0.15$, Viscosity at a temperature of 20° C. $\eta=20$ cp.

In the liquid crystal display device with the above constitution, the liquid crystal cell thickness (thickness d of the liquid crystal layer C) was 6.5 μm, the twist angle $\alpha$ of the liquid crystal molecules was 270° in a counterclockwise direction from the front side, the spontaneous twist pitch Ps was 7.9 μm, the regulated twist pitch Pc was 8.7 μm, and the pitch ratio of these (Pc−Ps)/Pc was 0.10. Also, the angle between the director direction of the liquid crystal molecules contacting the surfaces of the alignment layers 6 and 7 and the surfaces of the upper substrate 1 and the lower substrate 2 (pretilt angle) was each 35°.

When the test to drive the liquid crystal display device according to a multiplex driving system was conducted, bistable effect was small to give a high contrast ratio, and yet the time required for on-off was extremely short to have excellent response characteristic, and practically a high order time sharing driving with a duty ratio of 1/300 or higher was possible.

Further, this liquid crystal display device was driven according to a multiplex driving system with a duty ratio of 1/100 to determine the contrast ratio and the on-off display response time. As a result, the contrast ratio in the visible light region with wavelength of 400 to 700 nm, namely the ratio of the luminance of the reflected light under the selected state (dark) to that under the nonselected state (light), was found to be good as 1:15 or higher to give a sharp image with excellent contrast, and also the on-off response time was short as 150 msec or shorter whereby the display response characteristic was confirmed to be excellent.

EXAMPLE 2

In Example 1, the liquid crystal materials constituting the liquid crystal layer C was changed to a material comprising 1.20% by weight of an optically active substance (chiral nematic liquid crystal) "S-811" (trade name, produced by E. Merck Co.) added to a nematic liquid crystal B ($k_{33}/k_{11}$: 1.3, $\Delta\epsilon/\epsilon\perp$: 2.0, $\Delta n$: 0.13, $T_{NI}$: 96.3° C., $\eta$ (20° C.): 25 cp) (produced by Chisso Co.) (this is called "liquid crystal material 2"), and the constituent material of the spacer 8 was changed to a glass fiber "PF-70S" (trade name, produced by Nippon Denki Glass K.K.), and following otherwise the same procedure as in Example 1, a liquid crystal display device was prepared.

The above liquid crystal material 2 had the following characteristics:

Ratio $k_{33}/k_{11}$ of the bend elastic constant $k_{33}$ to the splay elastic constant $k_{11} = 1.3$, Ratio $\Delta\epsilon/\epsilon\perp$ of the dielectric constant anisotropy $\Delta\epsilon$ to the dielectric constant $\epsilon\perp$ in the direction perpendicular to the longer axis direction of the liquid crystal molecule = 2.0, Transition temperature from nematic liquid crystal to isotropic liquid $T_{NI} = 96.3°$ C., Refractive index anisotropy $\Delta n = 0.13$, Viscosity at a temperature of 20° C. $\eta = 25$ cp.

In the liquid crystal display device with the above constitution, the liquid crystal cell thickness (thickness d of the liquid crystal layer C) was 7.0 μm, the twist angle of the liquid crystal molecules was 270° in a counterclockwise direction from the front side, the spontaneous twist pitch Ps was 8.4 μm, the regulated twist pitch Pc was 9.3 μm, and the pitch ratio of these (Pc−Ps)/Pc was 0.10. Also, the angle between the director direction of the liquid crystal molecules contacting the surfaces of the alignment layers 6 and 7 and the surfaces of the upper substrate 1 and the lower substrate 2 (pretilt angle) was each 38°.

When the test to drive the liquid crystal display device according to a multiplex driving system was conducted, bistable effect was small to give a high contrast ratio, and yet the time required for on-off was extremely short to ahve excellent response characteristic, and practically a high order time sharing driving with a duty ratio of 1/300 or higher was possible.

Further, this liquid crystal display device was driven according to a multiplex driving system with a duty ratio of 1/100 to determine the contrast ratio and the on-off display response time similarly as in Example 1. As a result, the contrast ratio was found to be good as 1:13 or higher to give a sharp image with excellent contrast, and also the on-off response time was short as 160 msec or shorter whereby the display response characteristic was confirmed to be excellent.

COMPARATIVE EXAMPLE 1

A liquid crystal display device for comparison was prepared in the same manner as in Example 2 except that the liquid crystal materials was changed to a material comprising 0.88% by weight of an optically active substance (chiral nematic liquid crystal) "S-811" (trade name, produced by E. Merck Co.) to a nematic liquid crystal "ZLI-1132" (trade name, produced by E. Merck Co.) (this is called "liquid crystal material 1 for comparison").

The above liquid crystal material 1 for comparison had the following characteristics:

Ratio $k_{33}/k_{11}$ of the bend elastic constant $k_{33}$ to the splay elastic constant $k_{11} = 1.9$, Ratio $\Delta\epsilon/\epsilon\perp$ of the dielectric constant anisotropy $\Delta\epsilon$ to the dielectric constant $\epsilon\perp$ in the direction perpendicular to the longer axis direction of the liquid crystal molecule = 2.2, Transition temperature from nematic liquid crystal to isotropic liquid $T_{NI} = 71°$ C., Refractive index anisotropy $\Delta n = 0.14$, Viscosity at a temperature of 20° C. $\eta = 28$ cp.

In the liquid crystal display device for comparison with the above constitution, the liquid crystal cell thickness (thickness d of the liquid crystal layer C) was 7.0 μm, the twist angle α of the liquid crystal molecules was 270° in a counterclockwise direction from the front side, the spontaneous twist pitch Ps was 8.6 μm, the regulated twist pitch Pc was 9.3 μm, and the pitch ratio of these (Pc−Ps)/Pc was 0.08. Also, the angle between the director direction of the liquid crystal molecules contacting the surfaces of the alignment layers 6 and 7 and the surfaces of the upper substrate 1 and the lower substrate 2 (pretilt angle) was each 36°.

When the test to drive the liquid crystal display device according to a multiplex driving system was conducted, bistable effect was small to give a high contrast ratio, but the value of the elastic constant ratio $k_{33}/k_{11}$ was excessively large in the liquid crystal materials, whereby the time required for on-off was long to give low response characteristic and a high order time sharing driving with a duty ratio of 1/200 or higher could be performed with difficulty.

Further, this liquid crystal display device was driven according to a multiplex driving system with a duty ratio of 1/100 to determine the contrast ratio and the on-off display response time similarly as in Example 1. As a result, although the contrast ratio was good as 1:11, the on-off response time was long as several minutes, thus being inferior as compared with the liquid crystal display devices of Examples 1 and 2.

COMPARATIVE EXAMPLE 2

A liquid crystal display device for comparison was prepared in the same manner as in Comparative example 1 except that a material comprising 1.395% by weight of an optically active substance (chiral nematic liquid crystal) "S-811" (trade name, produced by E. Merck Co.) added to a nematic liquid crystal "ZLI-3243" (trade name, produced by E. Merck Co.) was used as the liquid crystal materials (this is called "liquid crystal material 2 for comparison").

The above liquid crystal material 2 for comparison had the following characteristics:

Ratio $k_{33}/k_{11}$ of the bend elastic constant $k_{33}$ to the splay elastic constant $k_{11} = 0.74$ Ratio $\Delta\epsilon/\epsilon\perp$ of the dielectric constant anisotropy $\Delta\epsilon$ to the dielectric constant $\epsilon\perp$ in the direction perpendicular to the longer axis direction of the liquid crystal molecule = 2.0, Transition temperature from nematic liquid crystal to isotropic liquid $T_{NI} = 65°$ C., Refractive index anisotropy $\Delta n = 0.14$, Viscosity at a temperature of 20° C. $\eta = 36$ cp.

In the liquid crystal display device for comparison with the above constitution, the liquid crystal cell thickness (thickness d of the liquid crystal layer C) was 7.0 μm, the twist angle α of the liquid crystal molecules was 270° in a counterclockwise direction from the front side, the spontaneous twist pitch Ps was 8.9 μm, the regulated twist pitch Pc was 9.3 μm, and the pitch ratio of these (Pc−Ps)/Pc was 0.05. Also, the angle between the director direction of the liquid crystal molecules contacting the surfaces of the alignment layers 6 and 7 and the surfaces of the upper substrate 1 and the lower substrate 2 (pretilt angle) was each 35°.

When the test to drive the liquid crystal display device for comparison according to a multiplex driving system was conducted, due to excessively small value of the elastic constant ratio $k_{33}/k_{11}$ of the liquid crystal materials, no bistable effect could be obtained and therefore the intensity change of the transmitted light to the applied voltage become moderate, whereby sufficiently high contrast ratio could not be obtained. Practically, when the contrast ratio was determined by driving the liquid crystal display device for comparison according to a multiplex driving system with a duty ratio of 1/100, it was found to be small as 1:6 to give no sufficient visual confirmability.

We claim:

1. A liquid crystal display device comprising liquid crystal materials aligned between a pair of substrates each having an alignment layer, respectively, characterized in that the following conditions (a) to (c) are satisfied:

(a) the twist angle of the liquid crystal molecules aligned between the above pair of substrates is 200° to 300°;

(b) the following relationship formula (1) is valid between the spontaneous twist pitch Ps of the liquid crystal molecules and the regulated twist pitch Pc of the liquid crystal molecules when the arrangement of liquid crystal molecules is compulsorily regulated by the alignment layers:

$$0 \leq (Pc - Ps)/Pc \leq 0.3 \quad (1); \text{ and}$$

(c) the following relationship formula (2) is valid between the splay elastic constant $k_{11}$ and the bend elastic constant $k_{33}$ of the above liquid crystal materials:

$$0.9 < k_{33}/k_{11} < 1.5 \quad (2).$$

2. A liquid crystal display device according to claim 1, wherein the angle created between the director direction of the liquid crystal molecules contacting at least one of the surfaces of the above alignment layers and the substrate surface having said alignment layer is not less than 5°.

3. A liquid crystal display device according to claim 1, wherein $\Delta\epsilon/\epsilon\perp$, the ratio of the dielectric constant anisotropy $\Delta\epsilon$ of the liquid crystal materials to the dielectric constant $\epsilon\perp$ in the direction perpendicular to the longer axis direction of the liquid crystal molecule is 1.8 or higher.

4. A liquid crystal display device according to claim 1, wherein said liquid crystal materials comprise at least one kind of a nematic liquid crystal material and at least one kind of an optically active substance.

5. A liquid crystal display device according to claim 4, wherein the amount of the optically active substance added to the nematic liquid crystal is 1.5% by weight or less.

6. A liquid crystal display device according to claim 1, wherein the transition temperature $T_{NI}$ from the nematic liquid crystal phase to an isotropic liquid phase in said liquid crystal materials is 90° C. or higher.

7. A liquid crystal display device according to claim 1, wherein said liquid crystal materials have a refractive index anisotropy $\Delta n$ which is 0.12 or more.

8. A liquid crystal display device according to claim 1, wherein a viscosity at the temperature of 20° C. of said liquid crystal materials is 30 cp or lower.

9. A liquid crystal display device according to claim 1, wherein the product $\Delta n \cdot d$ of a refractive index anisotropy $\Delta n$ of said liquid crystal materials and a thickness d (μm) of a liquid crystal layer C is 0.4 to 1.5.

10. A liquid crystal display device according to claim 1, wherein deviated angles β and γ are set at values so that the value of the sum of these angles β+γ is in the range of 90°±within 20°.

11. A liquid crystal display device according to claim 1, wherein deviated angles β and γ are set at values so that the value of the sum of these angles β+γ is in the range of −90°±within 20°.

12. A liquid crystal display device according to claim 1, wherein deviated angles β and γ are set at values so that the value of the sum of these angles β+γ is in the range of 0°±within 20°.

13. A liquid crystal display device according to claim 1, wherein a deviated angle β is set at a value of (360°−α)/2±within 15°.

14. A liquid crystal display device according to claim 1, wherein a deviated angle β is set at a value of −(α−180°)/2±within 15°.

15. A liquid crystal display device according to claim 1, wherein an angle θ created between an aligning treatment direction P of an upper substrate and an aligning treatment direction Q in a lower substrate is 20° to 120°.

* * * * *